Sept. 12, 1961   F. C. DETTMAN   2,999,350
TINE RAKE
Filed Aug. 3, 1959

INVENTOR.
FRED C. DETTMAN
BY
ATTORNEY

United States Patent Office 2,999,350
Patented Sept. 12, 1961

2,999,350
TINE RAKE
Fred C. Dettman, 821 Carson Ave., Rochester, N.Y.
Filed Aug. 3, 1959, Ser. No. 831,361
2 Claims. (Cl. 56—400.17)

This invention relates to spring tined lawn rakes, and more particularly to a modification thereof adapted for clearing grass of small elongated objects.

Lawn rakes of the spring tine type are particularly adapted to be employed for grass and leaves and have the advantage of lightly combing the lawn without digging, or tearing the grass. Such rakes, however, have the disadvantage in that they fail to collect small twigs, maple seeds (sometimes referred to as snappers), and other elongated small debris that readily becomes oriented parallel with the direction of rake movement to thereby slip between and escape the tines. Also the tines of such rakes tends to pierce leaves, with a consequent build-up of leaves on the tines, requiring manual removal.

The present invention is directed to a lawn rake of the spring tine type wherein light flexible wire mesh is applied to the under surface of the tines, from a point close to the end of the tines and extending along the tines a sufficient part of the length to assure that material picked up by the rake will not escape during the raking operation, and to guard against the tines thereof becoming choked up with leaves.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figures 1, 2:
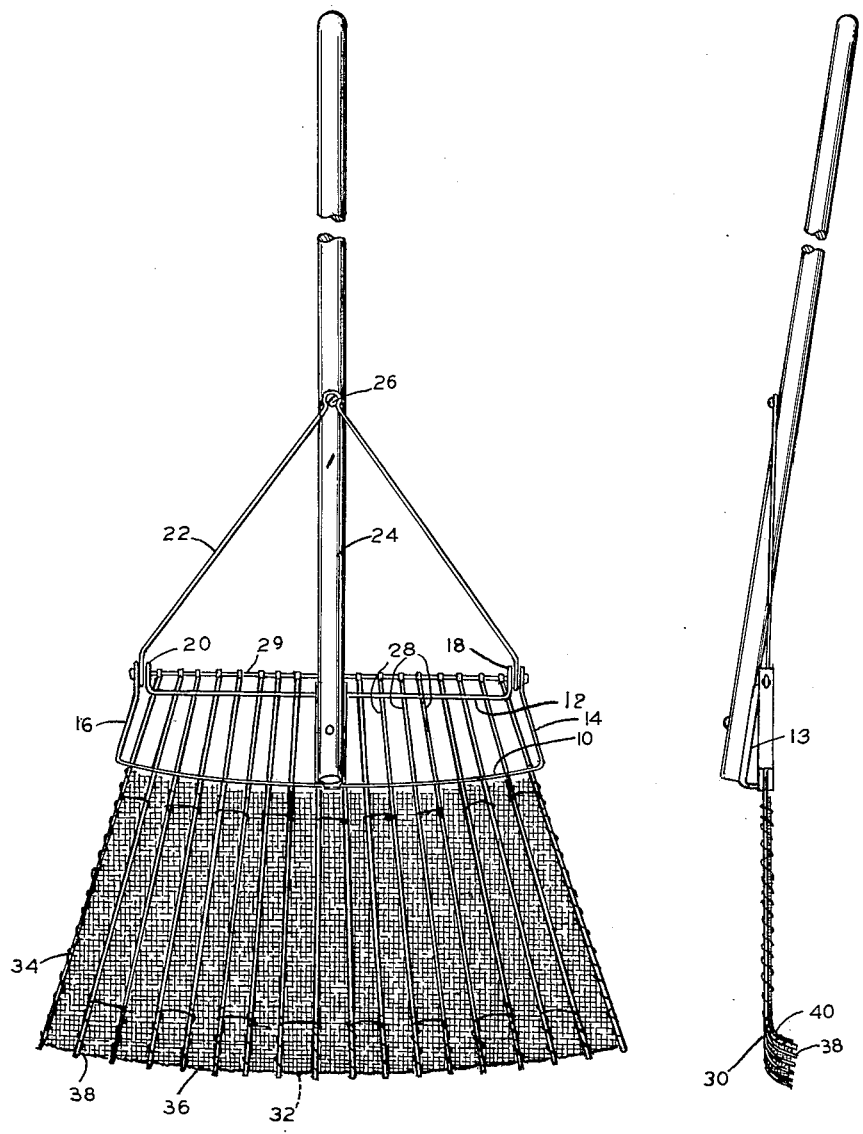
FIGURE 1 is a top plan view of the rake with the handle broken.
FIGURE 2 is a side elevational view of the rake with the handle broken.

In the drawings there is shown a rake frame comprising transverse members 10 and 12 joined together by a handle socket or channel 13. The member 10 at opposite ends is formed rearwardly as at 14 and 16, and cooperates with the rearwardly bent ends 18 and 20 of the frame member 12 to connect with a V brace 22, which is secured to the handle 24, as at 26.

Radiating tines 28 of flat spring steel strips usually about 3/16" wide and 1/32" thick extend through spaced slots in the frame members 10 and 12, and are secured at their rearward ends to the frame member in the form of a rod 29. Each of the tines at their ends are curved downwardly as at 30. The end-tips of said tines are disposed on an arc of long radius. In order to render the rake effective in respect to small twigs, seed, etc., a section of screen wire 32 formed to a segmental shape is lashed to the underside of the tines by suitable light binding wire 34. The selvage edge 36 of the screen wire section may be curved on a long radius and disposed about 1/4" inwardly from the tine ends as shown at 38, and the screen wire is lashed to each of the tines in the region of the tine curvature as is indicated at 40, to cause the mesh to conform to the curvature of the tines.

The screen wire may extend along the tines to a point adjacent the frame member 10. In practice such screen wire may be of a mesh anywhere from 10 or 12 to the inch to 4 to the inch, the mesh being preferably of light flexible wires so as to permit relative flexing between adjacent tines, as is necessary to accommodate irregular grounds being raked.

It will be seen that with the selvage edge of the mesh being located slightly to the rear of the ends of each tine, adequate space between tines and the selvage edge is provided for grass to clear between the tine ends 38 and beneath the selvage. Yet the rake is effective to clear the lawn of practically all kinds of debris such as grass clippings, twigs, seeds and the like which would otherwise escape if disposed lengthwise. Furthermore, the wire mesh rides over the grass and acts as a guard over the grass being raked such as to lighten the "feel" of the rake and prevent any tendency to dig in, which digging in would otherwise result in increasing the effort required in handling the rake.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A lawn rake comprising a frame having means for supporting a plurality of tines, a plurality of spaced spring flat cross sectioned tines extending in splayed arrangement from said supporting means in a common plane, the free ends of said tines having downwardly curved ends extending out of said plane, and having their tip ends terminating along an arc of relatively long radius, a section of wire mesh secured across the underside of the free ends of said tines and disposed on the concave side of the curved ends thereof, said mesh having a curved marginal edge disposed short of the end tips of said tines, and said mesh being flexibly bound to said tines, and underlying said tines and extending rearwardly along the tines to the frame.

2. A lawn rake comprising a frame, a plurality of spaced spring flat cross sectioned tines extending in splayed arrangement from said frame in a common plane, the free ends of said tines having downwardly curved ends extending out of said plane, and having their end-tips terminating along an arc of relatively long radius, a section of wire mesh secured across the underside of the free ends of said tines and disposed on the concave side of the curved ends thereof, said mesh having a curved marginal edge disposed about a quarter of an inch from each of the end tips of said tines, and said mesh being flexibly bound to said tines, and extending rearwardly along the tines to the frame.

References Cited in the file of this patent

UNITED STATES PATENTS

| 1,429,579 | Gaughan | Sept. 19, 1922 |
| 1,515,740 | Laidley | Nov. 18, 1924 |
| 2,040,205 | Kaufman | May 12, 1936 |
| 2,134,942 | Harkness | Nov. 1, 1938 |
| 2,207,488 | Laemmlin | July 9, 1940 |